March 7, 1961  G. N. HOWATT  2,974,008
METHOD FOR CALCINING OR FRITTING CERAMICS
Filed March 14, 1957
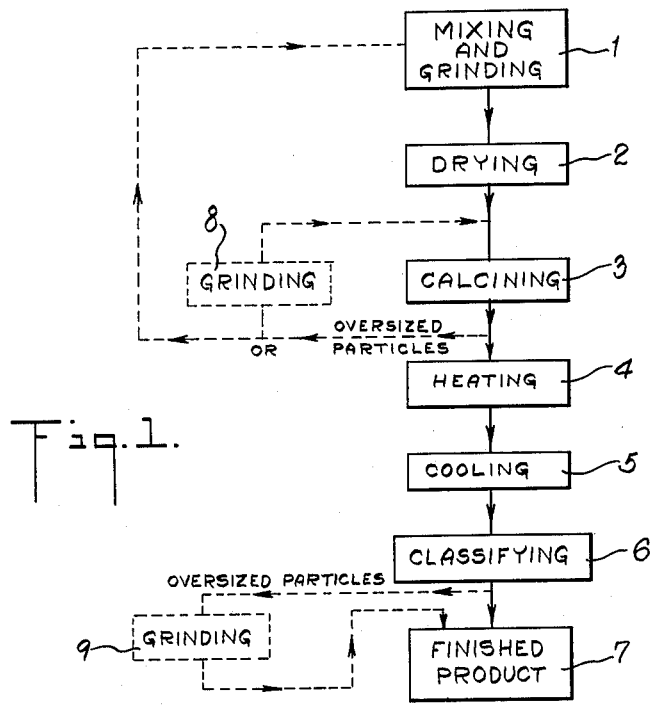
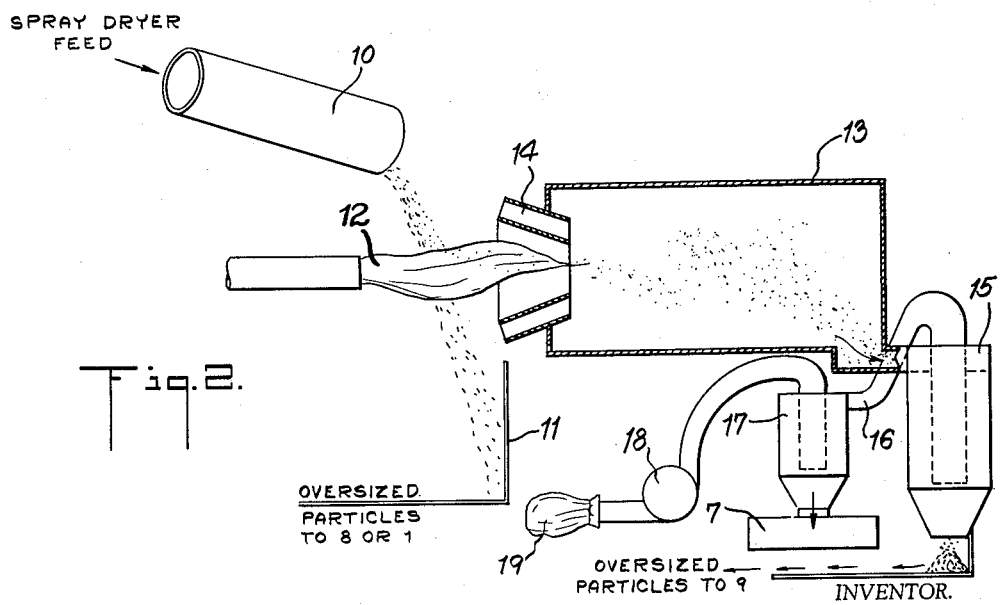
INVENTOR.
GLENN N. HOWATT
BY
Cyrus D. Samuelson
ATTORNEY 2,974,008
METHOD FOR CALCINING OR FRITTING CERAMICS Glenn N. Howatt, Metuchen, N.J., assignor to Gulton Industries, Inc., Metuchen, N.J., a corporation of New Jersey Filed Mar. 14, 1957, Ser. No. 646,077
2 Claims. (Cl. 23—51)

My invention relates to the processing of calcined ceramics, enamel frits and similar products and in particular to a method whereby it is possible to produce such materials in fine particles without impurities being added in processing.

The presently known methods, which are employed in the production of calcined ceramics, enamel frits and like materials, do not permit the user to obtain fully combined ceramics which are free of impurities. This is due to the fact that the ceramic material reacts with the refractory container during processing. On the other hand, if the forming temperature is kept low enough to avoid reaction with the refractory container, say 50° F. below the softening point, the ceramic is not fully combined or calcined.

When colored enamel frits are processed by presently known techniques, it is not possible to use the same enamel furnace for different colors because the colored enamel frit adheres to the furnace wall and discolors the next enamel frit.

It can readily be seen that there is need for a method whereby it is possible to form completely combined ceramic materials which are free of impurities and whereby it is possible to manufacture enamel frits of different colors sequentially in a single calciner.

Accordingly, it is a principal object of my invention to provide a method for producing pure calcined ceramics.

It is a further object of my invention to provide a method for producing enamel frits of various colors sequentially in a single furnace.

It is a still further object of my invention to provide a method for producing pure calcined ceramics and enamel frits of relatively small particles which are readily grindable without quenching.

It is a still further object of my invention to provide a method for producing calcined ceramics wherein the system is clean and there is no reaction between the material being processed and the refractory containers.

Other objects and advantages of my invention will be apparent during the course of the following description.

In the accompanying drawings, forming a part of this application, and in which like numerals are employed to designate like parts throughout the same, Figure 1 is a flow diagram of the method of my invention, and Figure 2 is a diagrammatic illustration of a device which is employed to carry out the method of my invention.

In the drawings wherein, for the purpose of illustration, is shown a preferred embodiment of my invention, the numeral 1 designates the mixing and grinding step. From mixing and grinding step 1, the material goes successively to drying step 2, calcining step 3, heating step 4, cooling step 5, and classifying step 6. Finished product 7 consists of those particles which are of the proper size determined by classifying step 6. Those particles, which are oversized after calcining step 3, are either fed to grinding step 8 and back to calcining step 3 or back to mixing and grinding step 1 for reprocessing. Those particles, which are oversized after classifying step 6, are fed to grinding step 9 where they are ground to the proper size of finished product 7.

After step 2, the particles being processed are fed to rotary calciner 10. The particles are dropped from 10 into flame 12. Those particles, which are oversized, are stopped by baffle 11 and carried back to 8 or 1, depending on the material being processed, by means of a moving belt (not shown) or similar device. The particles, which are of proper size, are carried by flame 12 into cooling chamber 13. Air funnel 14 is used to blow air into 13 to cool the particles in 13. Blower 18 is used to draw the air into classifier 15, through duct 16 to classifier 17 and thence through bag filter 19. The cooled particles are carried by the air and those which are oversized will drop through 15 and be carried to grinding step 9 by means of a moving belt or similar device (not shown). I prefer to use centrifugal classifiers but other types of classifiers may also be used. The particles of the correct size or smaller will be carried through duct 16 to 17. The particles of the correct size will be dropped through 17 and collected in a suitable bin for finished product 7 and those particles which are too small to drop through 17 will be collected in bag filter 19. A centrifugal wash collector may also be used to remove the particles which are too fine for the air cyclone classifiers. Several classifiers or a single classifier may be used and they may be connected in many ways to accomplish the desired results. The method shown in Figure 2 is merely an example of how the product classification may be accomplished.

Materials, which may be processed by the method of my invention, are barium titanate, barium zirconate, lead titanate, lead zirconate, barium stannate, lead stannate, bismuth stannate or any other ceramic compound which is formed by combining two metal oxides. The materials above are listed for illustration and I do not intend to limit the use of my invention to those compounds. Enamel frits of various compositions of any color may also be processed by using the teaching of my invention.

By way of example, to make pure barium titanate, I mix in step 1 the proper amount of either barium carbonate, barium oxide, an organic salt of barium or any other barium compound free of impurities with the proper amount of either titanium oxide, titanium hydrate, an organic salt of titanium or any other titanium compound which is free of impurities.

Mixing and grinding step 1 may be accomplished by means of a wet ball mill, a blunger, a colloid mill, a dispersion mill or any other means by which intimate dispersions may be obtained. I prefer to use a wet mill equipped with a rubber liner and plastic pebbles for the grinding material.

I prefer to accomplish drying step 2 by spray drying in order to obtain easily flowable particles of relatively uniform size.

For calcining step 3, I prefer to use rotary calciner 10 which is raised to the highest possible temperature below the reaction temperature between the particles and the refractory container. I prefer to use a dense alumina lining in calciner 10. For processing of barium titanate, the temperature of calciner 10 may be as high as 2100° F. A vibrated shute conveying the powder through a furnace may be used in lieu of rotary calciner 10. Any plastics, which may have come through steps 1 and 2, are burned off during calcining step 3.

The particles are dropped from 10 into flame 12. The temperature and length of flame 12, coupled with the rate of feed of the particles into 12, determine the final temperature of the particles, which should be the highest temperature possible to heat the particle without volatilization. Substantial volatilization of barium titanate starts at about 2700° F., and substantial volatilization of lead titanate starts at about 2300° F. The particles, which are oversize, namely, too heavy to be carried by flame 12, drop through 12 and are caught by baffle 11. These oversized particles are either ground to size and recalcined or are fed back to mixing and grinding step 1.

Particles of the proper size are carried by flame 12 into cooling chamber 13. Air is blown into 13 through air funnel 14 to facilitate the cooling in 13. Blower 18 serves to draw the air through 13, 15, 16 and 17 and to keep the particles in circulation in 13 and to cool them. The cooled particles are air carried from 13 into centrifugal classifier 15. The particles of the proper size and smaller are fed into classifier 17 through duct 16. The particles, which are oversize, drop through 15 from where they are carried to a grinder which may be either a continuous dry system or an intermittent wet system. This regrinding step may be eliminated when frits are being processed since they do not have to be very finely ground. The particles which are too fine to drop through 17 will be collected in bag filter 19. The contents of 19 may be added to 7 periodically or discarded as desired.

It can be seen that the process of my invention permits the production of pure ceramics wherein there has been no refractory material added to the ceramic and the product has been calcined at a high enough temperature so as to be fully combined.

Since there is no reaction between the calciner's refractory and the ceramic, the system is clean. It is therefore possible to process frits and other ceramics of different colors sequentially in the same calciner, it only being necessary to blow out the calciner by means of a vacuum cleaner, compressed air hose or similar device to remove any of the prior processed material which may have remained in the calciner.

The method of my invention permits the user to control the percentage of additive in the composition, thereby allowing for accurate control of the characteristics of the finally formed composition. For example, the percentage of the additive lead titanate in a barium titanate-lead titanate piezoelectric ceramic may be closely controlled so that the location of the transition point and other characteristics of the composition may be determined accurately and consistently. Other ceramic compositions, piezoelectric or otherwise, may be similarly controlled.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. The method of forming fine particles of pure calcined ceramics which comprises mixing and grinding at least two reactive compounds in the proper proportions to form said ceramic, heating the said ground and mixed compounds in a container to a temperature just below the temperature at which said compounds would react with the container, dropping the said heated compounds into a flame for suspending said compounds in the flame and further heating said compounds in the flame to a temperature for completing the reaction and calcining said ceramic without substantial volatilization thereof, catching said flame suspended calcined ceramic in a cooling air stream for suspending and cooling therein the ceramic to below reaction temperatures to recover pure fine particles thereof, and classifying the said particles.

2. The method in accordance with claim 1 wherein the ceramic formed is a titanate.

References Cited in the file of this patent

UNITED STATES PATENTS

| | | |
|---|---|---|
| 1,004,505 | Verneuil | Sept. 26, 1911 |
| 1,175,224 | Bleecker | Mar. 14, 1916 |
| 1,565,777 | Bertolini | Dec. 15, 1925 |
| 2,122,180 | Lederle | June 28, 1938 |
| 2,271,845 | Parsons | Feb. 3, 1942 |

FOREIGN PATENTS

| | | |
|---|---|---|
| 574,577 | Great Britain | Jan. 11, 1946 |

OTHER REFERENCES

Chemical Engineers' Handbook; 3rd edition, pub. by McGraw-Hill Book Co. 1950, (pages 843–845; 1116–1118; 1608–1609).